Figures 1, 2, 3:
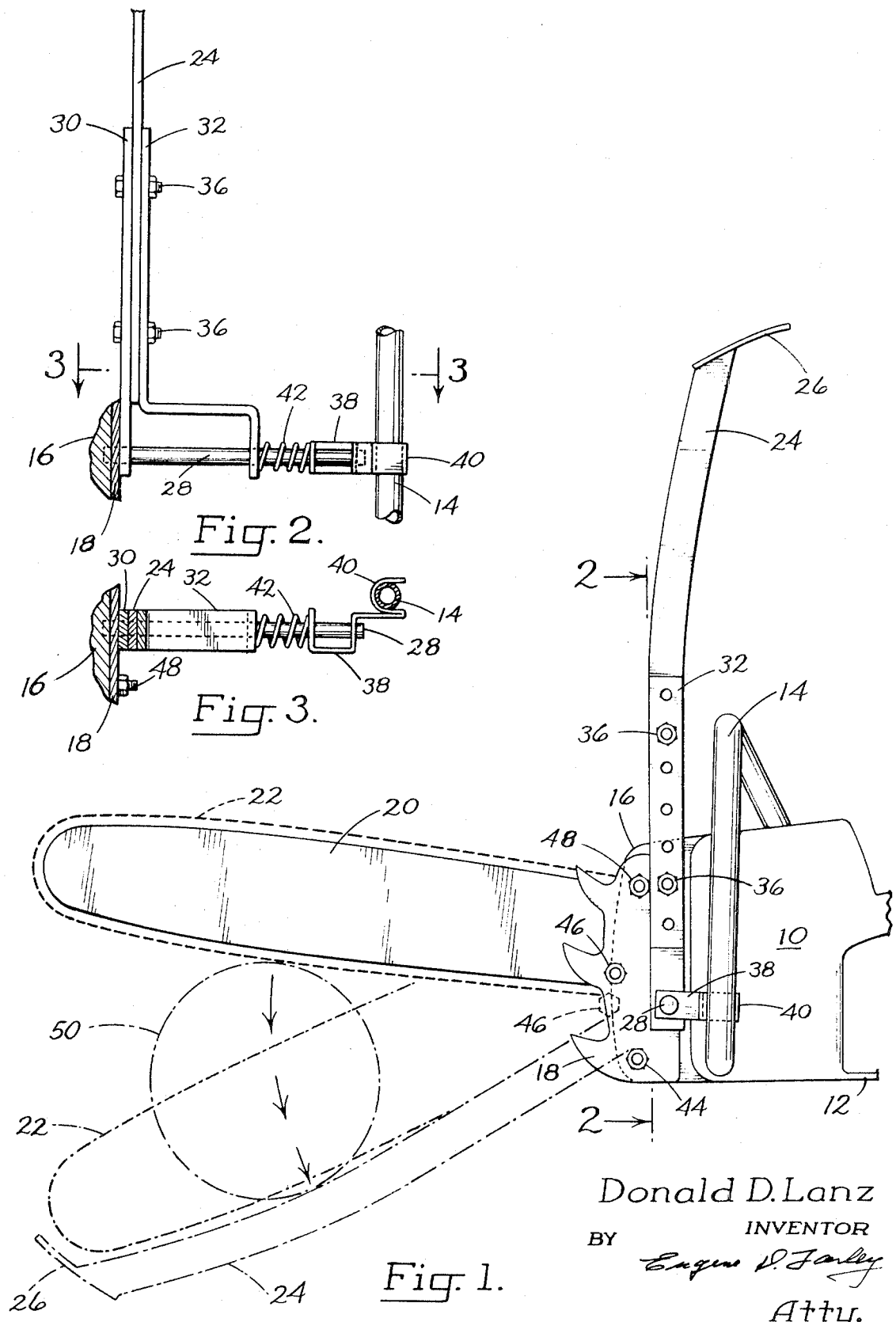

United States Patent
Lanz

[15] 3,636,996
[45] Jan. 25, 1972

[54] CHAIN SAW ANTIPINCH GUARD ARM

[72] Inventor: Donald D. Lanz, Route 2, Box 155, Oregon City, Oreg. 97045

[22] Filed: Dec. 12, 1969

[21] Appl. No.: 884,456

[52] U.S. Cl. .................................. 143/32 F, 143/159 R
[51] Int. Cl. .............................. B27b 17/02, B27g 19/06
[58] Field of Search ............................... 143/32, 159

[56] References Cited

UNITED STATES PATENTS 3,384,136   5/1968   Marin et al. ........................ 143/32 R

FOREIGN PATENTS OR APPLICATIONS 721,631   1/1955   Great Britain ...................... 143/32 F
746,304   11/1966  Canada ............................. 143/32 R Primary Examiner—Donald R. Schran
Attorney—Eugene D. Farley

[57] ABSTRACT

An antipinch guard arm for chain saw blades comprises a stiff, strong arm and pivotal mounting means mounting one end of the arm on the saw in a plane parallel to the plane of the saw blade. The arm is pivotal between a first position, downwardly divergent from the blade, a second position substantially parallel and adjacent to the blade, and a third position, upwardly divergent from the blade. At the beginning of the saw operation, the blade is placed on one side of a log or other object to be sawn and the arm in its downwardly divergent position on the opposite side. The free end of the arm is braced against the ground or other support. The chain saw then is applied to the log in the usual manner. As the cut progresses, the blade moves in the direction of the arm, which supports the object from the opposite side and thus prevents pinching. At the conclusion of the cut, the arm lies in its second position immediately adjacent the blade, where it protects the saw chain from damage by contacting the ground. When desired, the saw may be shifted to the third position, where it serves as an auxiliary handle when felling and limbing.

7 Claims, 3 Drawing Figures

PATENTED JAN 25 1972

3,636,996

Donald D. Lanz
INVENTOR
BY Eugene D. Farley
Atty.

CHAIN SAW ANTIPINCH GUARD ARM

This invention relates to a guard arm which, when attached to a chain saw, prevents pinching of the blade during operation of the saw and prevents damage to the saw chain from rocks and dirt at the conclusion of each saw cut.

A problem commonly encountered in the use of chain saws in that of pinching. As the cut progresses, the log collapses against the blade and binds the saw chain.

When bucking of large diameter this problem may be corrected by driving a wedge in the kerf. However, wedges may not be used when bucking logs of small diameter, because of interference of the wedge with the saw chain.

A second common problem attending the use of chain saws is that of dulling the saw chain. Where the log or other object being sawn rests on or near the ground, the blade of the saw is prone to drop downwardly at the conclusion of each cut. The free-running saw chain thereupon engages the underlying dirt and rocks. This obviously dulls the chain so that it must be resharpened frequently.

It accordingly is the object of the present invention to provide a guard arm for use as an attachment on chain saws, and having the following advantages:

It eliminates pinching by providing lifting leverage directly under the saw cut.

It protects the saw chain by preventing it from plunging into dirt and rocks below the log after each cut is completed.

It provides a prybar for prying a log off the ground and placing it in working position preliminary to sawing it into lengths.

It makes possible cutting at the end of the saw bar by providing a new leverage point between the end of the guard arm and the saw handle.

It protects the operator of the saw against accidental leg cuts.

It provides a secondary handle for use during falling and limbing of trees.

It is easily applied to chain saws of commercial types without extensive modification of their structure.

It is easily mounted and demounted, and easily adjusted between its various use positions.

The manner in which the foregoing and other objects of the present invention are accomplished will be apparent from the accompanying specification and claims, considered together with the drawings wherein:

FIG. 1 is a view in side elevation of a chain saw equipped with the herein described guard; and FIGS. 2 and 3 are fragmentary, detail views taken along lines 2—2 of FIG. 1 and 3—3 of FIG. 2, respectively.

As illustrated in the drawings, the herein described antipinch guard arm is applicable to conventional chain saws including a case 10 housing the motor assembly; an operating handle 12 and a peripheral handle 14 by means of which the saw is held; a forwardly directed case extension 16; a bucking plate 18 bolted to the latter; an outwardly and forwardly directed saw blade 20 coupled to the motor through suitable connections; and a saw chain 22 mounted on the blade.

The guard arm comprises an arm 24 of strong structural material such as bar steel. It preferably has a length equal to, or slightly longer than, the length of saw blade 20. Preferably it is concavely arcuate at its outer extremity to conform to the curvature of the outer end of the saw blade. A foot or bearing pad 26 is attached to its outer end.

Pivotal mounting means are providing for mounting the arm on the saw and for permitting free angular movement of the arm with reference to the saw blade.

In the illustrated form of the invention, the pivotal mounting means includes a shaft 28 extending outwardly from the saw blade substantially normal thereto. The shaft is mounted at the base of the saw blade, adjacent its lower margin, by suitable attaching means. Thus it may be threaded or riveted into dogging plate 18, or, if a dogging plate is not present in the saw assembly, into a sidewall of case extension 16.

Journaled on shaft 28 are a pair of arm support brackets 30, 32. Bracket 30 comprises a straight, stiff bar, while bracket 32 comprises a doubly bent bar. This provides an offset point of attachment of bracket 32 to shaft 28.

The inner ends of brackets 30, 32 journal shaft 28. This may be accomplished simply by providing in the respective ends of the brackets openings which receive the shaft.

The outer ends of brackets 30, 32 extend substantially parallel to each other in spaced relation and receive between them the inner end of bar 24. The bar and brackets are suitably locked together, preferably by providing a series of aligned perforations through all three members. These receive bolts 36 which permit longitudinal adjustment of bar 24 as required to provide the desired arm length.

The arm assembly thus constituted is releasably secured on shaft 28 by means of a clip 38. This comprises a U-shaped member having through its opposite sides openings dimensioned to receive the shaft. A cupped extension 40 clips releasably about peripheral handle 14.

A coil spring 42 is interposed between clip 38 and bracket 32. The force of the spring resiliently presses the arm assembly, and specifically the outside face of bracket member 30 thereof, against a structural member of the saw. This may be either case extension 16, or dogging plate 18.

The pivotal mounting provided in this manner permits free angular movement of arm 24 about shaft 28. Stop means are provided for arresting this movement in positions predetermined to establish operation of the arm in the desired manner.

One such stop means comprises a bolt 44 or other projecting member secured in the side face of case extension 16, or dogging plate 18.

Stop 44 is located in a position such that it is engaged by the arm when the arm is in its downwardly divergent position. A second stop 46 is engaged by the arm when the arm is in its saw chain-guarding position, i.e., substantially aligned with the working stretch of saw chain 22.

A third stop 48 similarly is attached to a side face of case extension 16, or of dogging plate 18. However, it is positioned nearly at the top of these elements in a location such that it engages and locks the arm against the saw case with the arm in its elevated position.

Adjustment of the arm between these three positions is accomplished merely by moving it outwardly with respect to the saw blade against the pressure of spring 42. When this is done, the arm may be shifted laterally along shaft 28 a distance sufficient to permit it to clear the stops as it is swung to the desired angular position. Upon releasing the arm, it is pressed inwardly by the action of spring 42, whereupon it is retained in its new operative position by the action of the selected stop.

OPERATION

In the application of the saw chain attachment to the bucking of a log 50, arm 24 is adjusted to its downward divergent position and inserted beneath the log, with foot 26 bearing against the ground or other support. Blade 20 is placed above the log, the log levered to a working position, and the saw cut started.

Operating the chain saw in the usual manner, by dogging the log with plate 18 and levering blade 20 downwardly, has the effect of applying the pressure of arm 24 to the underside of the log directly opposite the cut. This prevents pinching of the saw blade.

At the completion of the cut, the arm engages stop 46. This places the arm in its guarding position adjacent the blade, where it guards the saw chain from damage by dirt and rocks.

When it is desired to elevate arm 24, as when limbing and felling, the arm is displaced laterally until it clears stops 46, 48. It then is elevated and released. Thereupon it is retained in its elevated position, wedged against the saw case, by stop 48. In this position it may be used as a third handle, if desired.

In this manner there is provided an attachment universally applicable to commercial chain saws which not only effectively prevents pinching of the saw while cutting, and guards the chain against damage by contact with dirt and rocks, but which also is useful as a prybar and as an auxiliary handle.

Having thus described my invention in preferred embodiments, I claim:

1. In combination with a chain saw having an outwardly projecting saw chain blade mounting a saw chain having a working stretch, an antipitch guard attachment comprising:
   a. a stiff arm of substantial strength,
   b. pivotal mounting means mounting one end of the arm on the saw adjacent the base of the blade in a plane substantially parallel to the plane of the blade,
   c. the arm being pivotal, as the saw is applied to an object being sawn, between an initial angular position wherein it extends divergently to the working stretch of the saw chain in a position in bearing engagement with the side of the object opposite said working stretch, and a second angular position wherein it is adjacent and substantially aligned with the blade for protecting from damage the working stretch of the saw chain, and
   d. stop means on the saw positioned for stopping the angular movement of the arm at said second position,
   e. the outer free end of the arm being arranged for bearing engagement with a support, thereby enabling the application to the object being sawn of supporting pressure in a location opposite the saw cut.

2. The attachment of claim 1 wherein the arm is at least substantially as long as the saw blade and is provided at its outer end with a foot for bearing engagement with a support.

3. The attachment of claim 3 wherein the arm comprises a bar received between a pair of support brackets, and securing means securing the bar between the brackets in a predetermined degree of extension.

4. The attachment of claim 1 wherein the pivotal mounting means comprises a shaft mounted on the saw and extending outwardly substantially normal to the plane of the blade, the inner end of the arm being mounted on the shaft for pivotal and longitudinal movement relative thereto for releasable engagement of the arm with the stop means.

5. The attachment of claim 4 including spring clip means on the end of the shaft releasable retaining the arm thereon and exerting resilient pressure laterally against said arm, thereby holding it in operative position against the saw.

6. The attachment of claim 1 including stop means on the saw positioned for engaging the arm and maintaining it in an elevated rest position to the side of the blade opposite the working stretch of the saw chain.

7. In combination with a chain saw having an outwardly projecting saw chain blade, an antipitch guard attachment comprising:
   a. a stiff arm of substantial strength,
   b. pivotal mounting means mounting one end of the arm on the saw adjacent the base of the blade in a plane substantially parallel to the plane of the blade, the pivotal mounting means comprising a shaft mounted on the saw and extending outwardly substantially normal to the plane of the blade, the inner end of the arm being journaled on the shaft, and spring clip means on the end of the shaft releasably retaining the arm thereon and exerting resilient pressure laterally against the arm, thereby holding in operative position against the saw,
   c. the arm being pivotal, as the saw is applied to an object being sawn, between an initial angular position wherein it extends divergently to the blade in a position in bearing engagement with the side of the object opposite the saw blade, and the second angular position wherein it is adjacent and substantially aligned with the blade,
   d. the outer free end of the arm being arranged for bearing engagement with a support, thereby enabling the application to the object being sawn of supporting pressure in a location opposite the saw cut.

* * * * *